(12) United States Patent
Morita (10) Patent No.: US 10,284,737 B2
(45) Date of Patent: May 7, 2019

(54) SHEET FEEDING DEVICE AND IMAGE FORMING APPARATUS EMPLOYING THE SAME

(71) Applicant: Brother Kogyo Kabushiki Kaisha, Nagoya (JP)

(72) Inventor: Tetsuya Morita, Nagoya (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 0 days.

(21) Appl. No.: 15/886,140

(22) Filed: Feb. 1, 2018

(65) Prior Publication Data

US 2018/0278774 A1 Sep. 27, 2018

(30) Foreign Application Priority Data

Mar. 22, 2017 (JP) ................................. 2017-056657

(51) Int. Cl.
*H04N 1/00* (2006.01)
*B65H 5/06* (2006.01)

(52) U.S. Cl.
CPC ........... *H04N 1/00602* (2013.01); *B65H 5/06* (2013.01); *H04N 1/00604* (2013.01)

(58) Field of Classification Search
CPC ... H04N 1/00602; H04N 1/00604; B65H 5/06
USPC ....................................................... 358/498
See application file for complete search history.

(56) References Cited

U.S. PATENT DOCUMENTS

| | | | | |
|---|---|---|---|---|
| 5,570,961 A | * | 11/1996 | Osada ........................ | B41J 2/32 347/174 |
| 6,113,091 A | * | 9/2000 | Mizubata ............... | B65H 5/026 271/10.07 |
| 2013/0032996 A1 | * | 2/2013 | Kubota .................. | B65H 1/266 271/264 |
| 2016/0122144 A1 | * | 5/2016 | Fukumoto ................ | B65H 1/12 271/12 |

FOREIGN PATENT DOCUMENTS

| | | |
|---|---|---|
| JP | H11-222329 A | 8/1999 |
| JP | 2006-137500 A | 6/2006 |
| JP | 2007-217185 A | 8/2007 |
| JP | 2011-131958 A | 7/2011 |

* cited by examiner

*Primary Examiner* — Allen H Nguyen
(74) *Attorney, Agent, or Firm* — Burr & Brown, PLLC (57) ABSTRACT

A sheet feeding device has a sheet feed tray, a metallic pressure plate configured to support the plurality of sheets, the sheet feed tray being rockable about a rocking fulcrum between a descending position and an ascending position, a sheet feed roller configured to convey sheets supported by the pressure plate in a sheet conveying direction one by one, and an elastic member made of metal and arranged on the sheet feed tray, the elastic member engaging with the pressure plate and being electrically connected to the pressure plate, the elastic member contacting metal arranged outside the sheet feed tray to ground the pressure plate. The pressure plate has an engaging part configured to engage with the elastic member, the engaging part displacing in a direction where a contact pressure with respect to the elastic member increases when the pressure plate displaced from the descending position to the ascending position.

13 Claims, 9 Drawing Sheets

SHEET FEEDING DEVICE AND IMAGE FORMING APPARATUS EMPLOYING THE SAME

CROSS-REFERENCE TO RELATED APPLICATIONS

This application claims priority under 35 U.S.C. § 119 from Japanese Patent Application No. 2017-056657 filed on Mar. 22, 2017. The entire subject matter of the application is incorporated herein by reference.

BACKGROUND

Technical Field

The present disclosures relate to a sheet feeding device capable of suppressing generation of a discharge noise and an image forming apparatus employing the sheet feeding device.

Related Art

Conventionally, there has been known a sheet feeding device provided with a sheet tray. The sheet feeding device is further provided with a pressure plate configured to be moved up and down with supporting the sheets, and a push-up member configured to push up the pressure plate. The sheet feeding device is configured to be electrically grounded through the pressure plate and the push-up member.

The sheet feeding device as described above is typically fixed to the image forming apparatus, and has a metallic slide rail slidably connected to a metallic rail which is electrically connected to a metallic frame of a main body of the image forming apparatus, a sheet table secured to the slide rail and is configured to mount the sheet, a metallic lift plate (a pressure plate) provided on the sheet placement surface of the sheet table, a metallic operation plate (push-up plate) configured to push up the lift plate, and a plate spring which electrically connects the lift plate and the slide rail.

The operating plate is arranged below the lift plate, and has a fulcrum at a position on an opposite side in a sheet conveying direction with respect to the lift plate. the operating plate is configured to rock about the fulcrum, thereby pushing up the lift plate from below. Further, the plate spring is attached on an inner side of the slide rail, and contacts a lower surface of the operating plate with an elastic force of the plate spring. According to the above configuration, the lift plate on which the sheets are to be placed is electrically connected to the metallic frame of the main body of the image forming apparatus via the operation plate, the plate spring and the slide rail so as to be electrically grounded.

SUMMARY

In the conventional sheet feeding device as described above, when sheets set to the sheet feed tray includes tens of stacked sheets and has a sufficient weight, the lift plate (the pressure plate) and the operating plate (the push-up plate) firmly contact each other. However, when the number of sheets becomes smaller, the load applied to the pressure plate by the sheets decreases, and a contact failure between the pressure plate and the push-up plate may occur. When the contact failure occurs, grounding becomes insufficient and a discharge noise may be generated. In such a case, a discharge noise may be generated and a malfunction of the main body of the device may occur.

In consideration of the above, according to the aspects of the disclosures, there is provided a sheet feeding device configured to suppress occurrence of the discharge noise regardless of the number of stacked sheets of the sheet tray, and the image forming apparatus employing such a sheet feeding device.

According to aspects of the present disclosures, there is provided a sheet feeding device, which is provided with a sheet feed tray configured to accommodate a plurality of sheets in a stacked manner, a pressure plate made of metal and configured to support the plurality of sheets, the sheet feed tray being configured to rock about a rocking fulcrum between a descending position and an ascending position, a sheet feed roller configured to convey the sheets supported by the pressure plate in a sheet conveying direction one by one, and an elastic member made of metal and arranged on the sheet feed tray, the elastic member engaging with the pressure plate and being electrically connected to the pressure plate, the elastic member contacting metal arranged outside the sheet feed tray to ground the pressure plate. The pressure plate has an engaging part configured to engage with the elastic member, the engaging part displacing in a direction where a contact pressure with respect to the elastic member increases when the pressure plate displaced from the descending position to the ascending position.

According to aspects of the present disclosures, there is provided an image forming apparatus which is provide with an image forming device configured to form an image on a sheet, and a sheet feeding device configured to feed the sheet toward the image forming device. The sheet feeding device is provided with a sheet feed tray configured to accommodate a plurality of sheets in a stacked manner, a pressure plate made of metal and configured to support the plurality of sheets, the sheet feed tray being configured to rock about a rocking fulcrum between a descending position and an ascending position, a sheet feed roller configured to convey the sheets supported by the pressure plate, in a sheet conveying direction, toward the image forming device one by one, and an elastic member made of metal and arranged on the sheet feed tray, the elastic member engaging with the pressure plate and being electrically connected to the pressure plate, the elastic member contacting metal arranged outside the sheet feed tray to ground the pressure plate. The pressure plate has an engaging part configured to engage with the elastic member, the engaging part displacing in a direction where a contact pressure with respect to the elastic member increases when the pressure plate displaced from the descending position to the ascending position.

DETAILED DESCRIPTION OF THE EMBODIMENT

Hereinafter, referring to the accompanying drawings, an embodiment according to the present disclosures will be described.

[General Configuration of Image Forming Apparatus]

Figure 1:
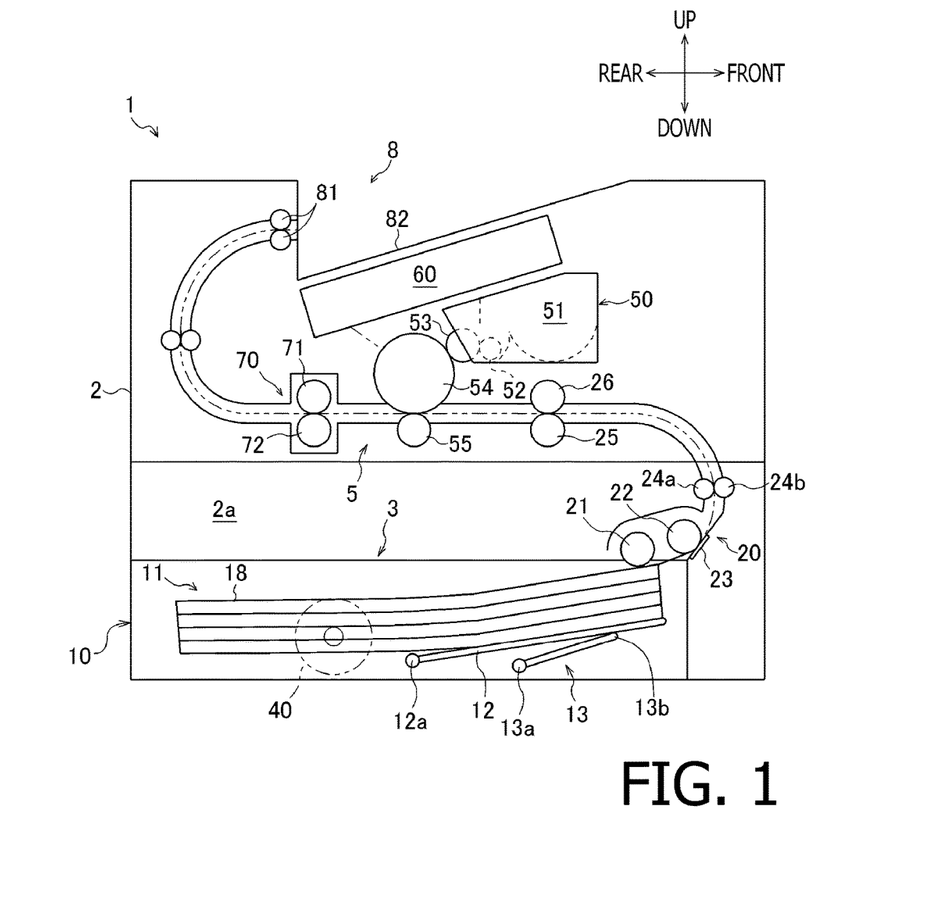
FIG. 1 is a cross-sectional side view of an image forming apparatus according to an illustrative embodiment of the present disclosures.

FIG. 1 shows an image forming apparatus 1 according to an illustrative embodiment of the present disclosures. The image forming apparatus 1 has a casing 2, a supplying device 3, a driving device 4 and an image forming device 5.

In the following description, a downstream side in a sheet discharging direction in which discharging rollers 81 of the image forming apparatus 1 conveys a sheet will be referred to as a "front" side of the image forming apparatus 1, and an opposite side will be referred to as a "rear" side. Further, a vertically downward side, in a thickness direction of the sheet, will be referred to as a "down" side, and a vertically upward side will be referred to as an "up" side. Further, right and left directions when the image forming apparatus 1 is viewed from the front side will be referred to as "left" and "right" sides of the image forming apparatus 1.

The casing 2 is a box-like body formed to have a rectangular parallelepiped shape and accommodates the supplying device 3, the image forming device 5 and the driving device 4. A lower part of the casing 2 is configured as a tray housing 2a to which the sheet feed tray 10 is detachably attached.

The supplying device 3 has a sheet tray 10 and a sheet conveyer 20, and arranged at lower part of the image forming apparatus 1. The supplying device 3 conveys the sheets 18 accommodated in the sheet feed tray 10 toward the image forming device 5 one by one with the sheet conveyer 20.

The sheet feed tray 10 is configured to be displaceable between an accommodated position and a separated position. When located at the accommodated position, the sheet feed tray 10 is accommodated at a particular position inside the tray housing 2a. When located at the separated position, the sheet feed tray 10 is withdrawn frontward from the tray housing 2a and separated therefrom.

Figure 2:
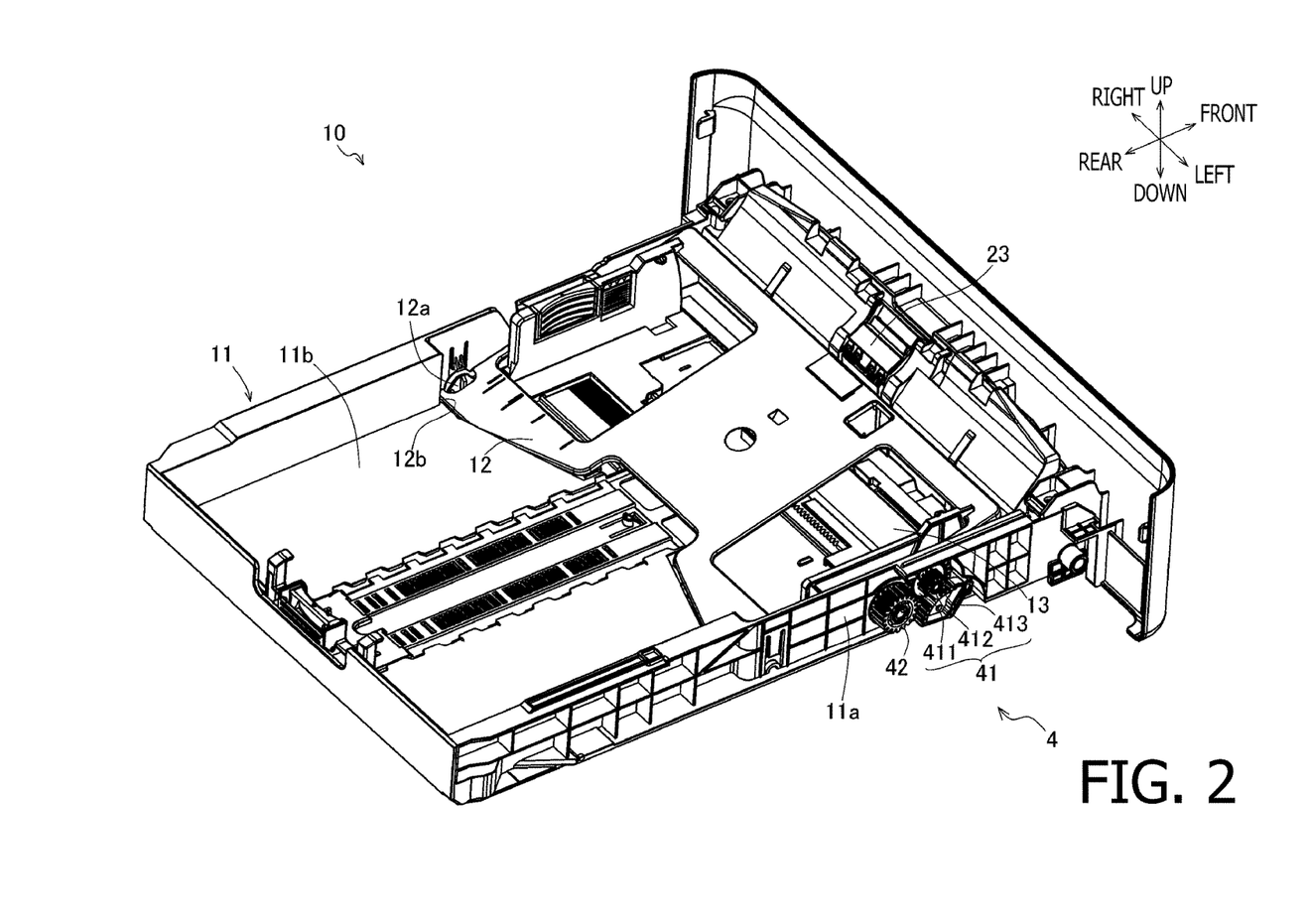
FIG. 2 is a perspective view of a sheet feed tray according to the illustrative embodiment of the present disclosures.

As shown in FIG. 2, the sheet feed tray 10 includes a tray body 11 accommodating the sheets 18, a pressure plate 12 arranged inside the tray body 11 so as to be moved upward/downward and supports the sheets 18, and a push-up plate 13 arranged, inside the tray body 11, below the pressure plate 12, and is displaceable between a separated position and a contacting position. When located at the separated position, the push-up plate 13 is separated from the pressure plate 12. When located at the contacting position, the push-up plate 13 contacts the pressure plate 12 from below and lifts the pressure plate 12.

The pressure plate 12 is rockably supported by the tray body 11 so as to be rockable about a rocking fulcrum 12a which is located at a rear end of the pressure plate 12. With this configuration, a front end part of the pressure plate 12 is moved in the up-down direction as the pressure plate 12 rocks about the rocking fulcrum 12a. In other words, the pressure plate 12 is rockable between a descending position and an ascending position centering around the rocking fulcrum 12a inside the tray body 11.

The push-up plate 13 is rockably supported by the tray body 11 so as to be rockable about the rocking fulcrum 13a at a rear end part of the push-up plate 13. With this configuration, as the push-plate 13 rocks around the rocking fulcrum 13a, the pressure plate is displaceable between a separated position and a contacting position. When located at the separated position, the push-up plate 13 is separated from the pressure plate 12. When located at the contacting position, the push-up plate 13 contacts the pressure plate 12 and moves up the pressure plate 12. The push-up plate 13 is configured such that a font end part thereof serves as a contacting part 13b which contacts a lower surface of the pressure plate 12. The push-up plate 13 is driven by a driving force transmitted from a motor 40. According to the illustrative embodiment, the pressure plate 12 and the push-up plate 13 are made of metal, for example, made of galvanized steel plates.

The driving device 4 has a motor 40 supplying the driving force, and a transmission mechanism 41 configured to transmit the driving force of the motor 40 to the push-up plate 13. As shown in FIG. 2, the diving device 4 is provided on a left side outer surface 11a of the tray body 11.

The transmission mechanism 41 is includes a lifting gear 411 engaging with a pressure plate driving gear 42 connected to the motor 40, a smaller gear 412 having a smaller diameter than that of the lifting gear 411 and coaxially connected to a rotation shaft of the lifting gear 411, and a gear 413 arranged on a downstream side, in the driving force transmitting direction, with respect to the gear 412 and engaging with the small gear 412. The gear 413 is connected to the push-up plate 13.

To the lifting gear 411, the driving force transmitted from the motor 40 is input through the pressure plate driving gear 42. The driving force input to the pressure plate driving gear 42 is transmitted to the push-up plate 13 through the gears 412 and 413, thereby driving the push-up plate 13.

When the push-up plate 13 located at the separated position is driven by the motor 40 and moved upward, the contacting part 13b reaches the contacting position at which the contacting part 13b contacts the pressure plate 12. After having reached the contacting position, the contacting part 13b moves up the pressure plate 12 with keeping the contacting state with the pressure plate 12. The pressure plate 12 located at the lowermost position is moved up, by the push-up plate 13, to a sheet feedable position at which the sheets 18 supported on the pressure plate 12 can be fed inside the image forming apparatus 1 (i.e., a state shown in FIG. 1).

The pressure plate driving gear 42 is provided to the casing 2 and is configured such that, when the sheet feed tray 10 is located at the accommodated position, the pressure plate driving gear 42 engages with the lifting gear 411 of the transmission mechanism 41 and the driving force of the motor 40 is input to the transmission mechanism 41.

Incidentally, when the sheet feed tray 10 is located at the separated position, the pressure late driving gear 42 and the lifting gear 411 are disengaged from each other, and the driving force of the motor 40 is not input to the transmission mechanism 41.

When the sheet feed tray 10 is located at the accommodated position, after the pressure plate 12 is moved up by the push-up plate 13, the pressure plate driving gear 42 is prevented from rotating reversely by a reverse rotation prevention mechanism provided between the motor 40 and the pressure plate driving gear 42. Therefore, even if the motor 40 stops rotating, the pressure plate 12 is held at the ascending position. When the pressure plate 12 is held at the ascending position, the pressure plate 12 and the push-up plate 13 are in a contacting state.

Incidentally, in a state where the pressure plate 12 is moved up by the push-up plate 13, when the sheet feed tray 10 located at the accommodated position is displaced to the separated position, the pressure plate diving gear 42 and the lifting gear 411 are disengaged from each other. Therefore, the pressure plate 12 moves downward to the lowermost position, and the push-up plate 13 moves downward to the separated position. In a state where the pressure plate 12 is moved down to the lowermost position and the push-up plate 13 has moved downward to the separated position, the pressure plate 12 and the push-up plate 13 are separated from each other.

The sheet conveyer 20 is provided with a pick-up roller 21, a separation roller 22, a separation pad 23, a conveying roller 24a, and a registration roller 25. The sheet conveyer 20 is configured to convey the sheets 18 held by the sheet feed tray 10 toward the image forming device 4 with separating one by one.

The pick-up roller 21 is a roller configured to pick up the sheet 18 moved up to the sheet feedable position by the pressure plate 12, and is arranged above a front end part of the pressure plate 12. When the sheets 18 placed on the pressure plate 12 are moved up to the sheet feedable position, the upper end part of the uppermost sheet 18 is press-contacted with the pick-up roller 21 at an appropriate pressure so as to be picked up by the pick-up roller 21. It is noted that the pick-up roller 21 is an example of a sheet feed roller configured to convey the sheet 18 supported by the pressure plate 12.

When the sheets 18 are supported on the pressure plate 12, the upward movement of the pressure plate 12, which is moved up by the push-up plate 13, is stopped when the sheets 18 reach the sheet feedable position at which the uppermost sheet 18 is press-contacted with the pick-up roller 21.

When no sheets 18 are supported on the pressure plate 12, the upward movement of the pressure plate 12 is stopped when the pressure plate 12 has reached to an uppermost position within its movable range in the up-down direction. In this case, the uppermost position within the movable range of the pressure plate 12 may be designed, for example, at a position where the pressure plate 12 is press-contacted with the pick-up roller 21.

The separation roller 22 is arranged on a downstream side, in the sheet conveying direction, with respect to the pick-up roller 21. The separation pad 23 is arranged to face the separation roller 22, and is urged toward the separation roller 22.

The sheet(s) 18 picked up by the pick-up roller 18 is fed toward the separation roller 22 side, and one sheet 18 is separated from the other between the separation roller 22 and the separation pad 23, and conveyed toward the conveying roller 24a.

The conveying roller 24a is configured to apply a conveying force to the sheet 18, and is arranged on a downstream side, in the sheet conveying direction, with respect to the separation roller 22. Facing the conveying roller 24a, a paper particle removing roller 24b is arranged. The sheet 18 conveyed toward the conveying roller 24a is nipped by the conveying roller 24a and the paper particle removing roller 24b, and is further conveyed toward the registration roller 25.

The registration roller 25 is arranged on a downstream side, in the sheet conveying direction, with respect to the conveying roller 24a, and is configured to once restrict the movement of the leading end of the conveyed sheet 18 at a nip between the registration roller 25 and the follow-up roller 26 arranged to face the registration roller 25, then convey the sheet 18 toward a transfer position at a particular timing.

The image forming device 5 is arranged on a downstream side, in the sheet conveying direction, with respect to the supplying device 3, and is configured to form an image on the sheet 18 conveyed from the supplying device 3.

The image forming device 5 has a process cartridge 50 configured to transfer the image onto the surface of the sheet 18 conveyed from the supplying device 3, and an exposure assembly 60 configured to expose the surface of a photosensitive drum 54 of the process cartridge 50 with light, and a fixing assembly 70 configured to fix the image transferred onto the surface of the sheet 18 by the process cartridge 50.

The process cartridge 50 is arranged above the tray housing 2a in the casing 2, and is provided with a developer chamber 51, a supplying roller 52, a developing roller 53, the photosensitive drum 54 and a transfer roller 55.

The exposure assembly 60 is provided with a laser diode, a polygonal mirror, lenses and reflectors, and emit a scanning laser beam modulated based on the image data input to the image forming apparatus 1 toward the photosensitive drum 54, thereby exposing the surface of the photosensitive drum with the laser beam.

The developer chamber 51 accommodates toner as the developer. The toner accommodated in the developer chamber 51 is agitated by a not-shown agitating member and conveys the toner to the supplying roller 52. The supplying roller 52 supplies the toner conveyed from the developer chamber 51 to the developing roller 53.

The developing roller 53 is arranged to be closely contacted with the supplying roller 52, and is configured to hold the toner supplied from the supplying roller 52 and positively charged by a slide-contact member (not shown). Further, a positive developing bias is applied to the developing roller 53 by a not-shown bias applying device.

The photosensitive drum 54 and the developing roller 53 are arranged adjacently to each other. The surface of the photosensitive drum 54 is uniformly and positively charged by a not-shown charger, and then exposed to the laser beam emitted by the exposure assembly 60. An electric charge of an exposed portions of the photosensitive drum 54 becomes lower than other portions, thereby an electrostatic latent image being formed based in the image data on the surface of the photosensitive drum 54.

Thereafter, as the positively charged toner is supplied by the developing roller 53 on the surface of the photosensitive drum 54 on which the electrostatic latent image is formed, the latent image is developed and a developer image is formed.

The transfer roller 55 is arranged to face the photosensitive drum 54, and a negative bias is applied to the transfer roller 55 by a not-shown bias applying device. As the photosensitive drum 54 carrying the developer image thereon and the transfer roller 55 to which the negative transfer bias is applied sandwich the sheet 18 therebetween and convey the sheet 18 in the sheet conveying direction, the developer image on the surface of the photosensitive drum 54 is transferred onto the surface of the sheet 18.

The fixing assembly 70 is provided with a heat roller 71 and a pressure roller 72. The heat roller 71 is driven by the driving force transmitted from the motor 40 to rotate, which the heat roller 71 is heated as an electrical power is supplied thereto from a not-shown power source. The pressure roller 72 is arranged to face the heat roller 71 and closely contact thereto so as to be driven to rotate as the heat roller 71 rotates. When the sheet 18 on which the developer image has been transferred is conveyed to the fixing assembly 70, the heat roller 71 and the pressure roller 72 convey the sheet 18 with sandwiching the sheet 18 therebetween to apply heat and pressure, thereby the developer image being fixed on the sheet 18.

A discharging assembly 8 is arrange on a downstream side, in the sheet conveying direction, with respect to the image forming device 5, and is configured to discharge the sheet 18 on which the image is formed (i.e., the developer image has been fixed thereon) outside the casing 2. The discharging assembly 8 is provided with discharge rollers 81 and a discharge tray 82. The discharge rollers 81 are a pair of rollers facing each other, and discharge the sheet 18 conveyed from the fixing assembly 70 toward outside the casing 2. According to the illustrative embodiment, the discharge tray 82 is defined on the upper surface of the casing 2, and the sheets 18 discharged outside the casing 2 are stacked on the discharge tray 82.

The pressure plate 12 of the image forming apparatus 1 has an engaging part 12b (see FIG. 7) which engages with the elastic member 30 and is configured such that, when the pressure plate 12 moves from the descending position to the ascending position, the engaging part 12b is displaced in a direction where contact pressure with the elastic member 30 increases. The engaging part 12b is arranged in a vicinity of one of the right and left ends of the pressure plate 12 and at an edge part 121 on a rear end side of the pressure plate 12 (see FIGS. 5 and 6). Further, the engaging part 12b is arranged on an upstream side, in the sheet conveying direction, with respect to the rocking fulcrum 12a which is a center of the rocking movement of the pressure plate 12.

Figure 5:
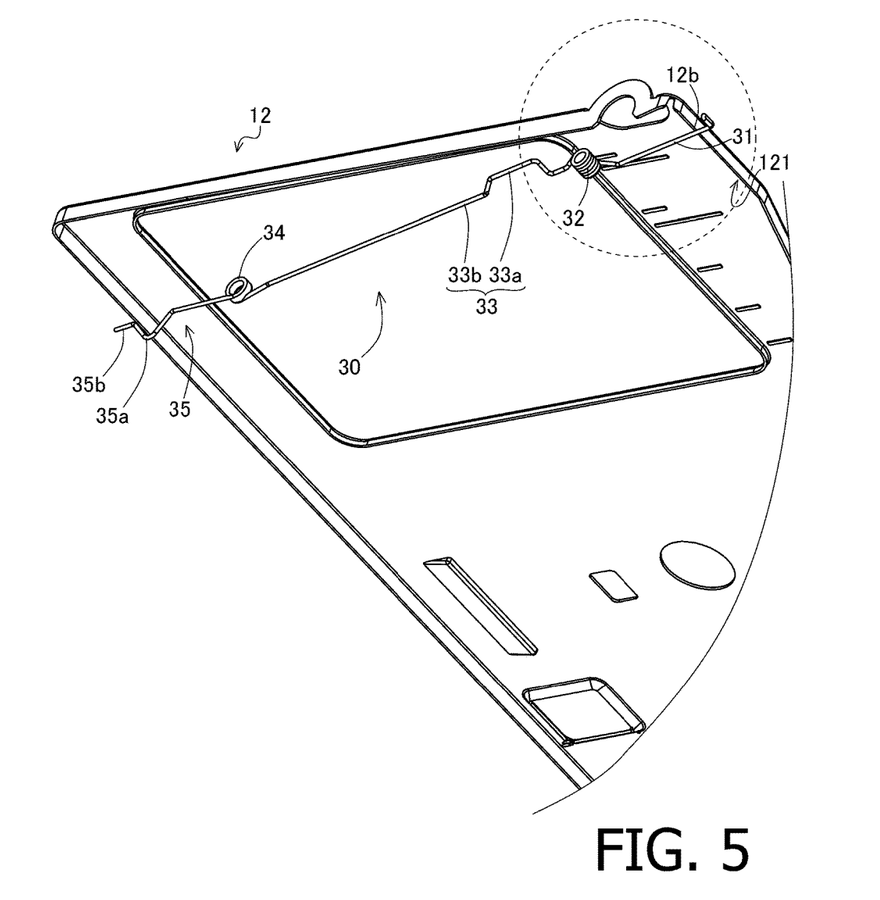
FIG. 5 is a partially enlarged perspective view showing the pressure plate at an ascending position and the elastic member.
Figure 6:
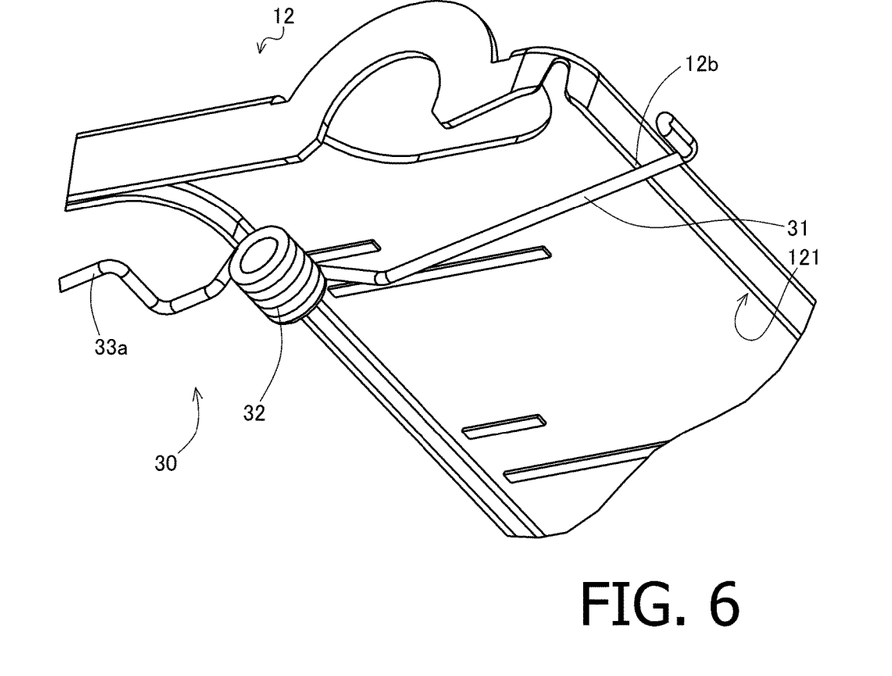
FIG. 6 is an enlarged perspective view showing a part of FIG. 5 and showing a state where an engaging portion of the pressure plate and an elastic member engage and contact each other.

It is noted that the edge part 121 of the pressure plate 12 is a portion of a peripheral edge of the pressure plate 12, and includes edges defined on a rear end side, right and left end sides, and a front end side of the pressure plate 12.

[Configuration of Elastic Member Provided to Sheet Feed Tray]

As shown in FIGS. 3-9, the sheet feed tray 10 has an elastic member 30 which is provided to the tray body 11 and is to be engaged with the pressure plate 12 so as to be electrically connected with pressure plate 12. The elastic member 30 is a metallic member configured to contact a metal part outside the sheet feed tray 10 (i.e., a metal frame 27, which will be described later), thereby electrically grounding the sheet feed tray 10. The elastic member 30 is made of electrically conductive metallic material.

For example, the elastic member 30 is configured by a torsion coil spring, which includes a first end part 31, a first coil part 32, an intermediate part 33, a second coil part 34 and a second end part 35 in this order from an upstream side to a downstream side of the sheet conveying direction. The elastic member 30 is arranged at one of ends of the tray body 11 in the width direction (i.e., the right-left direction in FIG. 3) which is a direction perpendicular to the sheet conveying direction. At least a part of the elastic member 30 (e.g., a portion except for the rear end part of the first end part 31) is arranged below the pressure plate 12 and a portion which is covered with one of the right and left end parts of the pressure plate 12.

Figure 3:
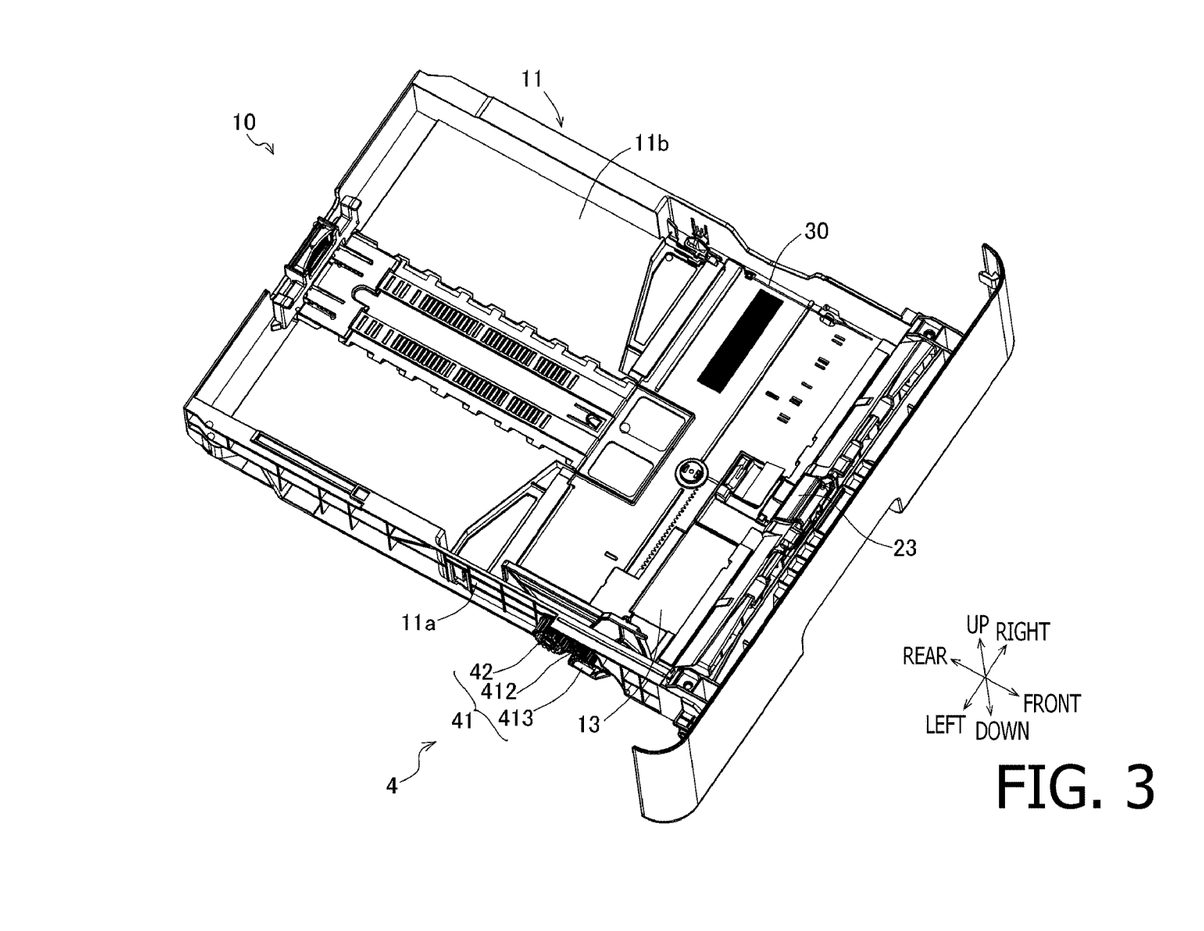
FIG. 3 is a perspective view showing the sheet feed tray with removing a pressure plate so as to show an elastic member.
Figure 4:
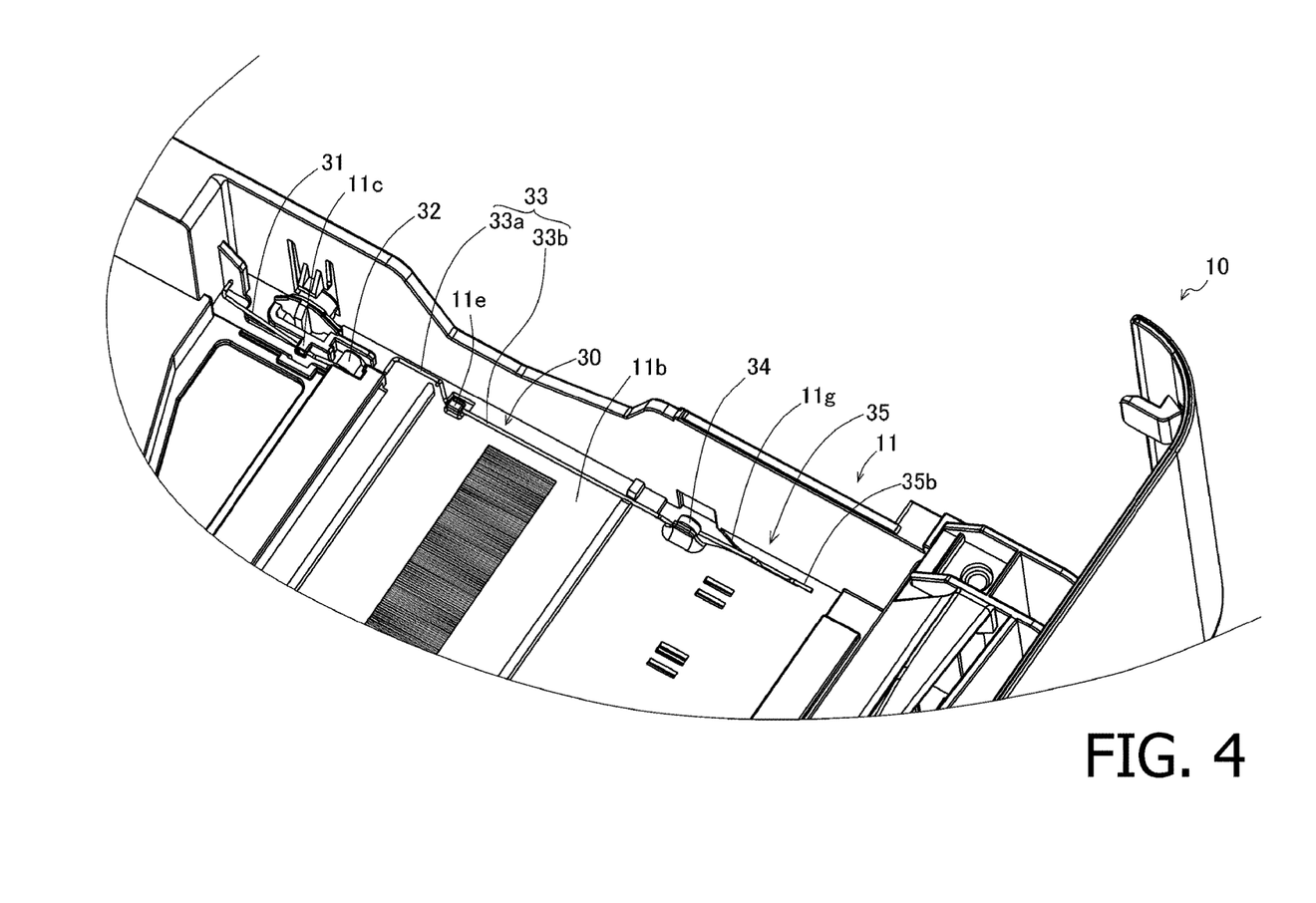
FIG. 4 is a partially enlarged perspective view showing a part of FIG. 3.

The first end part 31 is an arm-like spring part which extends rearward from one end of the first coil part 32. A rear end of the first end part 31 extends on a rear side with respect to a rear end of the pressure plate 12, and is configured to engage with the engaging part 12b of the pressure plate 12 in accordance with the displacement, in the up-down direction, of the pressure plate 12 so that the first end part 31 is electrically connected with the pressure plate 12. A middle part of the first end part 31 is hooked by a restriction member 11c so that an upward displacement of the first end part 31 with respect to a particular height position is restricted. The restriction member 11c is formed to the tray body 11, and is arranged in the vicinity of the rocking fulcrum 12a of the pressure plate 12.

The first coil part 32 is a coil-shaped spring part of the torsion coil spring, and is held to be journaled by a first coil journaling part 11d (see FIG. 7) which is a cylindrical member having an axis parallel with the right-left direction. The first coil part 32 is configured such that a resilient force of the first coil part 32 acts in a direction where a rear end side of the first end part 31 is moved upward as a reactive force when a force to turn the first coil part 32 in a winding-in direction is applied.

The intermediate part 33 is a linear spring part extending rearward from the other end of the first coil part 32 and connected to one end of the second coil part 34. The intermediate part 33 includes a rectangular part 33a extending rearward from the other end of the first coil part 32 and bent into a rectangular shape, and a liner spring part 33b extending from a front end of the rectangular part 33a and is connected to one end of the second coil part 34. The rear end of the liner spring part 33b is locked by a hook-shaped spring locking part 11e provided to the bottom surface 11b of the tray body 11.

The second coil part 34 is a coil-shaped spring part of the torsion coil spring, and is held to be journaled by a second coil journaling part 11f (see FIG. 7) which is provided to the bottom surface 11b of the tray body 11 and has an outwardly convex shape in the right-left direction. The second coil part 34 is configured such that a resilient force of the second coil part 34 acts in a direction where a front end side of the second end part 35 is moved downward as a reactive force when a force to turn the second coil part 34 in a winding-in direction is applied.

The second end part 35 is an arm-like spring part of which intermediate part is curved, and extends frontward from the other end of the second coil part 34. The second end part 35 has, at its intermediate part, a V-shaped curved part 35a which is a downwardly convex part, and a locking part 35b which is a linear spring part extending from the front end of the curved part 35a. The curved part 35a of the second end part 35 protrudes downward further than the bottom surface 11b of the tray body 11. On the bottom surface 11b of the tray body 11, a through hole 11g, which is an elongated hole extending in the front-rear direction is formed (see FIG. 4), and the curved part 35a of the second end part 35 protrudes downward with respect to the bottom surface 11b through the through hole 11g. The locking part 35b is a part locked at a front edge part of the through hole 11g. when the locking part 35b is locked at the front edge part of the through hole 11g, the send end part 35 is located at the lowermost position within a displaceable range in the up-down direction of the second end part 35. Thus, the curved part 35a of the second end part 35 is configured to be inserted in and removed from the through hole 11g in accordance with the displacement thereof in the up-down direction.

In the tray housing 2a inside the casing 2, a metal frame 27 is provided. The metal frame 27 contacts the curved part 35a of the second end part 35 of the elastic member 30 when the sheet feed tray 10 is located at the accommodated position.

The metal frame 27 is configured to enforce the casing 2 (see FIG. 7) and is configured by a frame made of metal. The metal frame 27 is arranged at a portion below the sheet feed tray 10 where the curved part 35a of the elastic member 30 protrudes, and is grounded. The metal frame 27 is press-contacted with the second end part 35 of the elastic member 30 so as to resist the elasticity of the second end part 35 of the elastic member 30 to move the metal frame 27 downward with the second journaling part 11 being the fulcrum. Further, the second end part 35 of the elastic member 30 contacts the metal frame 27 so as to be slidable in the front-rear direction which is the displaceable direction of the sheet feed tray 10.

Figure 8:
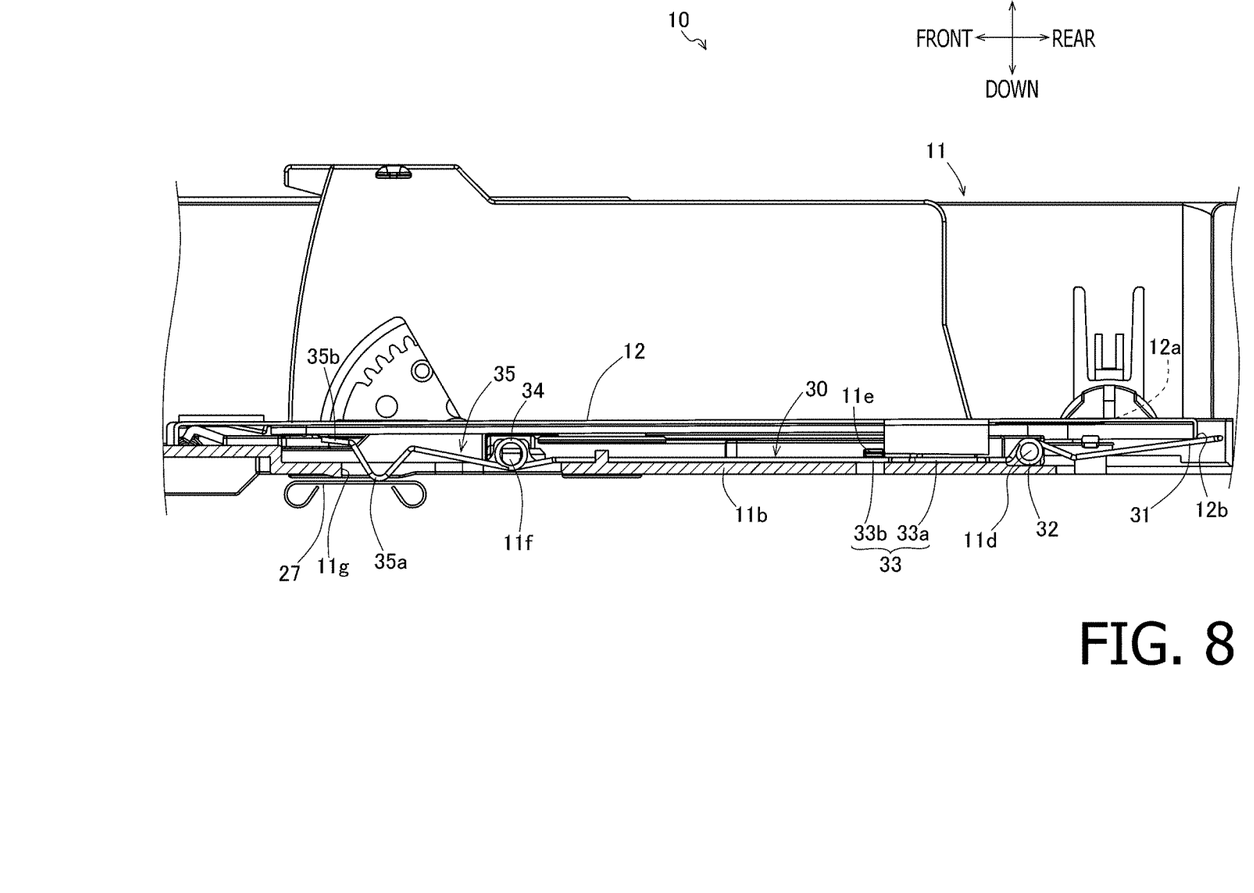
FIG. 8 is a cross-sectional view showing the sheet feed tray located at the accommodated position, the pressure plate located at a descending position, the elastic member provided to the sheet feed tray, and the metallic frame provided to the main body.
Figure 9:
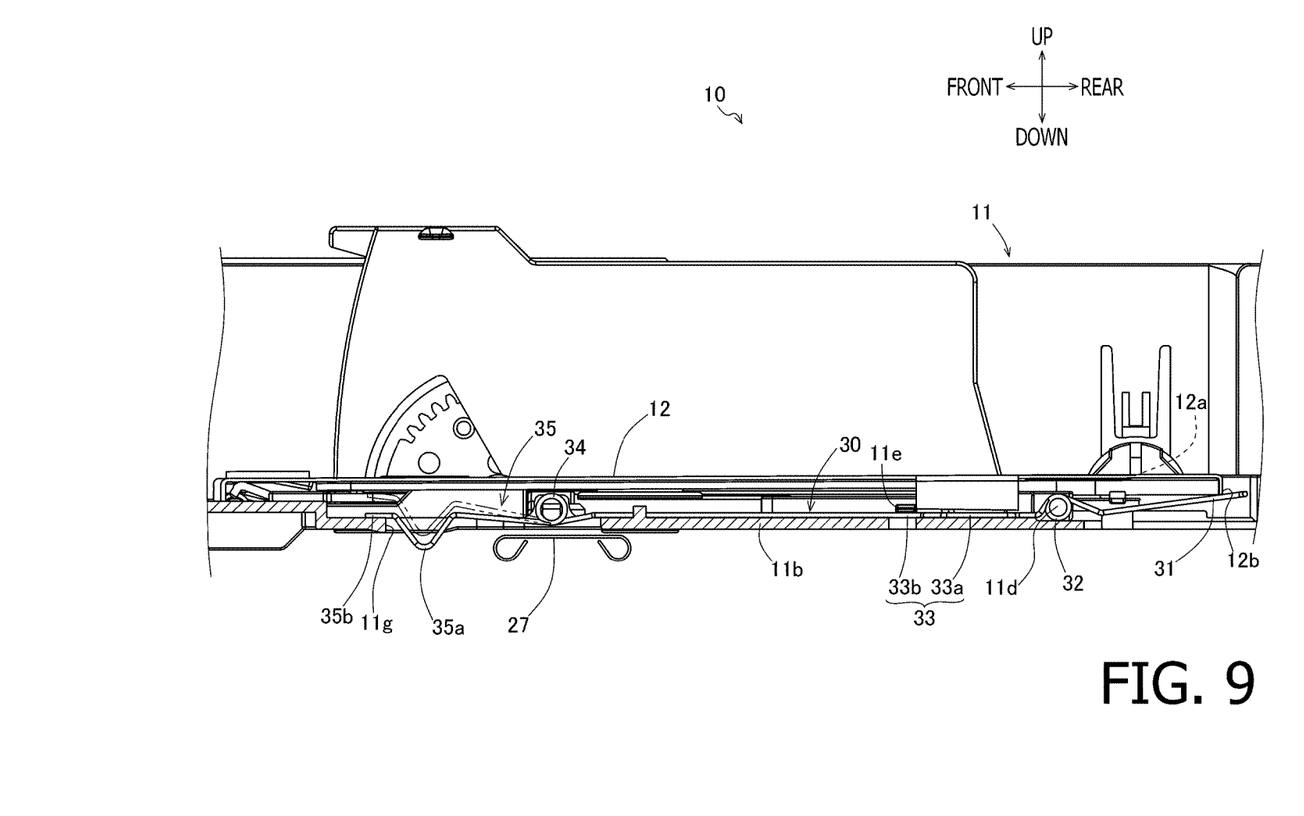
FIG. 9 is a cross-sectional side view of the sheet feed tray located at a separated position, the pressure plate located at the descending position, the elastic member provided to the sheet feed tray and the metal frame provided to the main body.

Concretely, when the sheet feed tray 10 is located at the accommodated position as shown in FIG. 8, since the curved part 35a of the second end part 35 contacts the metal frame 27 so as to be slidable in the front-rear direction, it becomes possible to certainly make the curved part 35a of the second end part 35 contact the metal frame 27. Incidentally, as shown in FIG. 9, when the sheet feed tray 10 is displaced from the accommodated position to the separated position, it is possible to release the connection between the curved part 35a of the second end part 35 and the metal frame 27 easily.

Further, when the number of stacked sheets 18 on the sheet feed tray 10 is sufficient, the pressure plate 12 is substantially parallel to the bottom surface 11b of the tray body 11 or located at the lowermost position as shown in FIG. 8. In such a state, the engaging part 12b of the pressure plate 12 and the first end part 31 of the elastic member 30 engage with each other and thus electrically connected. Further, as the curved part 35a of the second end part 35 of the elastic member 30 and the metal frame 27 are electrically connected, the pressure plate 12 is grounded through the elastic member 30.

Figure 7:
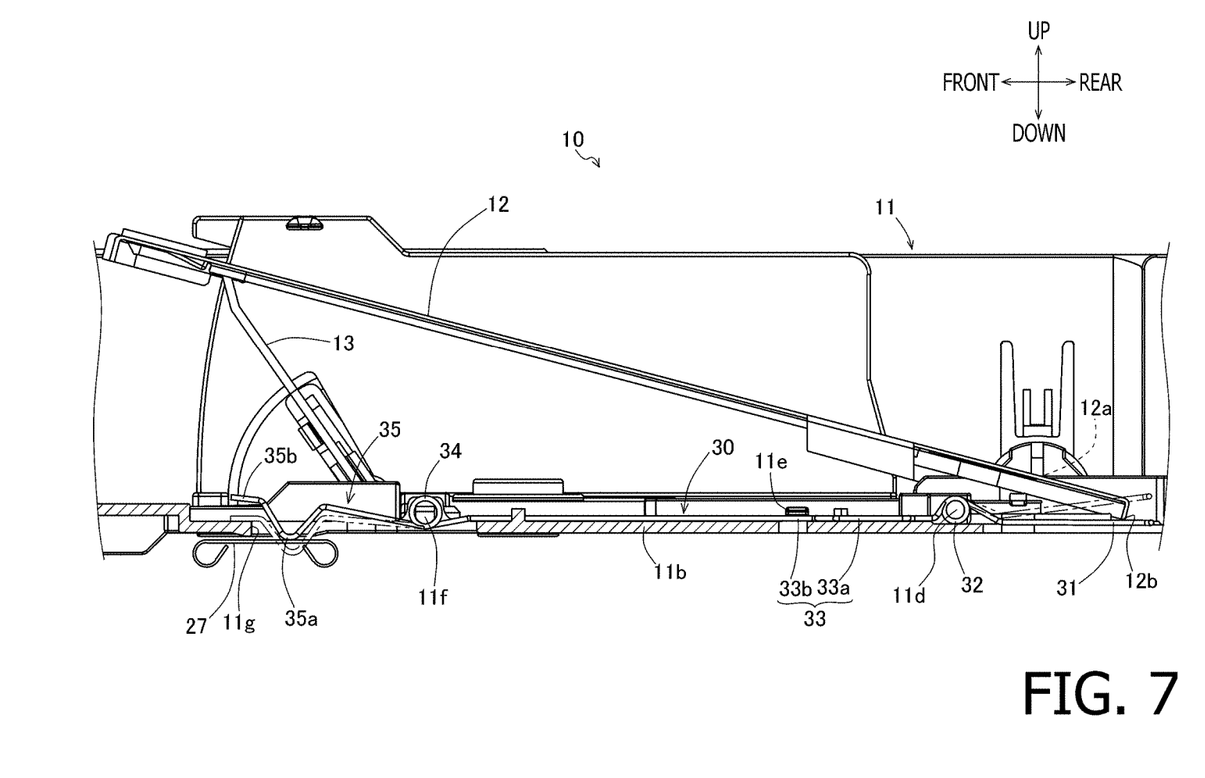
FIG. 7 is a cross-sectional side view showing the sheet feed tray located at an accommodated position, the pressure plate located at the ascending position, the elastic member provided to the sheet feed tray, and a metal frame provided to the main body.

Further, as shown in FIG. 7, when the number of stacked sheets 18 on the sheet feed tray 10 becomes relatively small, and the pressure plate 12 is displaced from the descending position to the ascending position, the engaging part 12b of the pressure plate 12 is displaced downward in comparison with a state shown in FIG. 8, and pushes down the first end part 31 of the elastic member 30. In this state, similar to the above-described case where the number of stacked sheets 18 on the sheet feed tray 10 is sufficient, the pressure plate 12 and the elastic member 30 are electrically connected. Further, by the resilient force of the first coil part 32, a force acts in a direction where the first end part 31 of the elastic member 30 pushes up the engaging part 12b of the pressure plate 12, and the contact pressure between the engaging part 12b of the pressure plate 12 and the first end part 31 of the elastic member 30 increases. With this configuration, it is further ensured that the pressure plate 12 is grounded through the elastic member 30.

According to the present embodiment, the pressure plate 12 is made of a galvanized steel plate. However, it is not necessary that the entire pressure plate 12 is made of the galvanized steel plate. It is sufficient that the pressure plate 12 and the elastic member 30 are electrically connected when the pressure plate 12 and the elastic member 30 contact each other.

Further, according to the present embodiment, the pressure plate 12 and the elastic member 30 directly contact each other and electrically connected. This configuration may be modified such that the pressure plate 12 and the elastic member 30 indirectly contact with a conductive member (e.g., a metal plate) being sandwiched therebetween.

In the image forming apparatus 1, the sheet feeding device is configured by the sheet feed tray 10 having the pressure plate 12, the casing 2, the tray housing 2a, the sheet conveyer 20, and the driving device 4. Further, in the image forming apparatus 1, the so-called electrophotographic image forming device 5 is employed. However, the aspects of the present disclosures need not be limited to the above configuration, and, for example, a so-called inkjet type image forming device may be employed.

[Effects of the Embodiment]

As described above, the image forming apparatus 1 is configured such that the sheet feeding device of the image forming apparatus 1 includes the sheet feed tray 10, the pressure plate 12, the pick-up roller 21 as the sheet feed roller, and the elastic member 30. The pressure plate 12 engages with the elastic member 30. Further, the pressure plate 12 has the engaging part 12b which displaced in a direction where the contact pressure with respect to the elastic member 30 increases when the pressure plate 12 moves from the descending position to the ascending position.

With the above configuration, when the pressure plate 12 moves from the descending position to the ascending position, the contact pressure between the pressure plate 12 and the elastic member 30 increase. Therefore, even if the number of the sheets 18 supported on the pressure plate 12 becomes relatively small, it is possible to certainly make the pressure plate 12 be grounded, thereby generation of the discharge noise being suppressed.

Further, the engaging part 12b is provided to the edge part 121 of the pressure plate 12.

According to the above configuration, when, for example, the pressure plate 12 is configured by a metal plate, a cut surface of the metal plate is exposed to outside at the edge part 121, and the cut surface is not plated, the conductivity when the engaging part 12b of the pressure plate 12 and the elastic member 30 contact can easily be secured, and it is further certain that the pressure plate 12 is grounded.

Further, the engaging part 12b is arranged on an upstream side in the sheet conveying direction with respect to the rocking fulcrum 12a which serves as the rocking center of the pressure plate 12.

With the above configuration, when the pressure plate 12 rocks about the rocking fulcrum 12a and the downstream side end part of the pressure plate 12 is moved up, the engaging part 12b provided on the upstream side of the pressure plate 12 is moved downward, and the contact pressure between the pressure plate 12 and the elastic member 30 further increases, and it becomes possible to securely ground the pressure plate 12 even if the number of the sheets 18 becomes relatively small, thereby generation of the discharge noise being suppressed.

At least a part of the elastic member 30 is arranged below the pressure plate 12 and is covered with the pressure palate 12.

Therefore, the elastic member 30 is arranged to overlap the pressure plate 12 when viewed below the pressure plated 12 and in the up-down direction, and the elastic member 30 does not obstacle the conveyance of the sheet 18. Further, it is less possible that the elastic member 30 contact the user.

The elastic member 30 is configure by the torsion coil spring.

By employing the torsion coil spring rather than a compression spring as the elastic member 30, the end of the torsion coil spring and a portion of the pressure plate 12 which contacts the torsion coil spring graze each other when the pressure plate 12 rocks. Therefore, the contact portions of the torsion coil spring and the pressure plate 12 are ground each other, and the electrical connection between the pressure plate 12 and the torsion spring is further ensured.

It is noted that the elastic member 30 is arranged at one end part, in the width direction which is a direction perpendicular to the sheet conveying direction, on the sheet feed tray 10.

By arranging the elastic member 30 at one end part, in the width direction, of the sheet feed tray 10, the elastic member 30 can easily be positioned when the elastic member 30 is assembled to the sheet feed tray 10.

What is claimed is:

1. A sheet feeding device, comprising:
a sheet feed tray configured to accommodate a plurality of sheets in a stacked manner;
a pressure plate made of metal and configured to support the plurality of sheets, the sheet feed tray being configured to rock about a rocking fulcrum between a descending position and an ascending position;
a sheet feed roller configured to convey the sheets supported by the pressure plate in a sheet conveying direction one by one; and
an elastic member made of metal and arranged on the sheet feed tray, the elastic member engaging with the pressure plate and being electrically connected to the pressure plate, the elastic member contacting metal arranged outside the sheet feed tray to ground the pressure plate,
wherein the pressure plate has an engaging part configured to engage with the elastic member, the engaging part displacing in a direction where a contact pressure with respect to the elastic member increases when the pressure plate displaced from the descending position to the ascending position.

2. The sheet feeding device according to claim 1, wherein the engaging part is provided to an edge part of the pressure plate.

3. The sheet feeding device according to claim 1, wherein the engaging part is arranged on an upstream side in the sheet conveying direction with respect to the rocking fulcrum of the pressure plate.

4. The sheet feeding device according to claim 1, wherein at least a part of the elastic member is arranged below the pressure plate and is covered with the pressure plate.

5. The sheet feeding device according to claim 1, wherein the elastic member comprises a torsion coil spring.

6. The sheet feeding device according to claim 1, wherein the elastic member is arranged at one end part, in a width direction perpendicular to the sheet conveying direction, on the sheet feed tray.

7. An image forming apparatus comprising,
an image forming device configured to form an image on a sheet; and
a sheet feeding device configured to feed the sheet toward the image forming device,
the sheet feeding device comprising:
a sheet feed tray configured to accommodate a plurality of sheets in a stacked manner;
a pressure plate made of metal and configured to support the plurality of sheets, the sheet feed tray being configured to rock about a rocking fulcrum between a descending position and an ascending position;
a sheet feed roller configured to convey the sheets supported by the pressure plate, in a sheet conveying direction, toward the image forming device one by one; and
an elastic member made of metal and arranged on the sheet feed tray, the elastic member engaging with the pressure plate and being electrically connected to the pressure plate, the elastic member contacting metal arranged outside the sheet feed tray to ground the pressure plate,
wherein the pressure plate has an engaging part configured to engage with the elastic member, the engaging part displacing in a direction where a contact pressure with respect to the elastic member increases when the pressure plate displaced from the descending position to the ascending position.

8. The image forming apparatus according to claim 7, wherein the engaging part is provided to an edge part of the pressure plate.

9. The image forming apparatus according to claim 7, wherein the engaging part is arranged on an upstream side in the sheet conveying direction with respect to the rocking fulcrum of the pressure plate.

10. The image forming apparatus according to claim 7, wherein at least a part of the elastic member is arranged below the pressure plate and is covered with the pressure plate.

11. The image forming apparatus according to claim 7, wherein the elastic member comprises a torsion coil spring.

12. The image forming apparatus according to claim 7, wherein the elastic member is arranged at one end part, in a width direction perpendicular to the sheet conveying direction, on the sheet feed tray.

13. A sheet feeding device, comprising:
a sheet feed tray configured to accommodate a plurality of sheets in a stacked manner;
a pressure plate made of metal and configured to support the plurality of sheets, the sheet feed tray being configured to rock about a rocking fulcrum between a descending position and an ascending position;
a sheet feed roller configured to convey the sheets supported by the pressure plate in a sheet conveying direction one by one; and
an elastic member arranged on the sheet feed tray, the elastic member being electrically conductive, the elastic member engaging with the pressure plate and being electrically connected to the pressure plate, the elastic member contacting metal arranged outside the sheet feed tray to ground the pressure plate,
wherein the pressure plate has an engaging part configured to engage with the elastic member, the engaging part displacing in a direction where a contact pressure with respect to the elastic member increases when the pressure plate displaced from the descending position to the ascending position.

* * * * *